United States Patent
Fahlenkamp

(10) Patent No.: US 9,602,006 B2
(45) Date of Patent: Mar. 21, 2017

(54) METHOD AND A CONTROLLER FOR DETERMINING A DEMAGNETIZATION ZERO CURRENT TIME FOR A SWITCHED MODE POWER SUPPLY

(71) Applicant: Infineon Technologies AG, Neubiberg (DE)

(72) Inventor: Marc Fahlenkamp, Geretsried (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 463 days.

(21) Appl. No.: 13/658,859

(22) Filed: Oct. 24, 2012

(65) Prior Publication Data
US 2014/0112030 A1 Apr. 24, 2014

(51) Int. Cl.
*H02M 3/335* (2006.01)

(52) U.S. Cl.
CPC ....... *H02M 3/33507* (2013.01); *H02M 3/335* (2013.01); *H02M 3/33523* (2013.01)

(58) Field of Classification Search
CPC .................................................. H02M 3/335
USPC .......... 363/21.06, 21.07, 21.14, 21.5, 21.15, 363/21.16, 21.17, 21.13, 21.12, 21.08, 363/21.11, 97
See application file for complete search history.

(56) References Cited

U.S. PATENT DOCUMENTS

| | | |
|---|---|---|
| 6,198,638 B1 | 3/2001 | Lee |
| 6,839,246 B1 | 1/2005 | Zhang et al. |
| 7,012,819 B2 | 3/2006 | Feldtkeller |
| 7,262,977 B2 | 8/2007 | Kyono |
| 7,791,913 B1 | 9/2010 | Su |
| 7,800,923 B2 | 9/2010 | Yang |
| 7,869,231 B2 | 1/2011 | Cohen |

(Continued)

FOREIGN PATENT DOCUMENTS

| | | |
|---|---|---|
| CN | 1255772 A | 6/2000 |
| CN | 1965466 A | 5/2007 |

(Continued)

OTHER PUBLICATIONS

Fairchild Semiconductor, "AN6203 Applying SG6203 to Control a Synchronous Rectifier of a Flyback Power Supply", www.fairchildsemi.com, Jan. 17, 2008, pp. 1-8.

(Continued)

*Primary Examiner* — Matthew Nguyen
*Assistant Examiner* — Trinh Dang
(74) *Attorney, Agent, or Firm* — Viering, Jentschura & Partner mbB

(57) ABSTRACT

In various embodiments a method is provided for determining a demagnetization zero current time for a switched mode power supply having a transformer, a first side and a second side being galvanically separated from each other and a switched mode power supply controller, the method including: determining a first voltage being applied to one side of the transformer; determining a second voltage provided at the other side of the transformer; determining a time the first voltage is provided to a winding of the transformer; and determining, by a circuit located on the same side of the transformer as the switched mode power supply controller, the demagnetization zero current time using the determined first voltage, the determined second voltage and the determined time.

33 Claims, 8 Drawing Sheets

(56) References Cited

U.S. PATENT DOCUMENTS

| | | |
|---|---|---|
| 8,611,109 B2 | 12/2013 | Roessler et al. |
| 2004/0240243 A1 | 12/2004 | Meyer et al. |
| 2005/0024897 A1 | 2/2005 | Yang et al. |
| 2006/0215424 A1* | 9/2006 | Aso et al. ............... 363/21.01 |
| 2007/0103946 A1 | 5/2007 | Kyono |
| 2008/0130325 A1* | 6/2008 | Ye .................. H02M 3/33507 363/21.14 |
| 2008/0137379 A1 | 6/2008 | Mao |
| 2010/0027298 A1 | 2/2010 | Cohen |
| 2010/0182808 A1* | 7/2010 | Sato et al. ............. 363/21.18 |
| 2011/0188271 A1* | 8/2011 | Shinotsuka ......... H02M 3/335 363/21.15 |
| 2012/0250366 A1* | 10/2012 | Wang et al. ............ 363/21.15 |
| 2013/0272036 A1* | 10/2013 | Fang ..................... 363/21.17 |

FOREIGN PATENT DOCUMENTS

| | | |
|---|---|---|
| DE | 102011083884 A1 | 4/2012 |
| EP | 1499004 A1 | 1/2005 |

OTHER PUBLICATIONS

Fairchild Semiconductor, "FAN6204 Synchronous Rectification Controller for Flyback and Forward Freewheeling Rectification", www.fairchildsemi.com, Nov. 2010, pp. 1-14.

Linear Technology Corporation "LT3825 Isolated No-Opto Synchronous Flyback Controller with Wide Input Supply Range", 2007, pp. 1-32.

Infineon Technologies AG "ICE2HS01G High Performance Resonant Mode Controller", Datasheet, Version 2.1, May 24, 2011, pp. 1-29.

Office Action in the related U.S. Appl. No. 13/658,875 issued on Sep. 12, 2014, 11 pages.

Office Action in the corresponding German application No. 102013111675.2 issued on Sep. 17, 2014, 10 pages.

Office Action in the related German application No. 102013111348.6 issued on Sep. 19, 2014, 8 pages.

\* cited by examiner

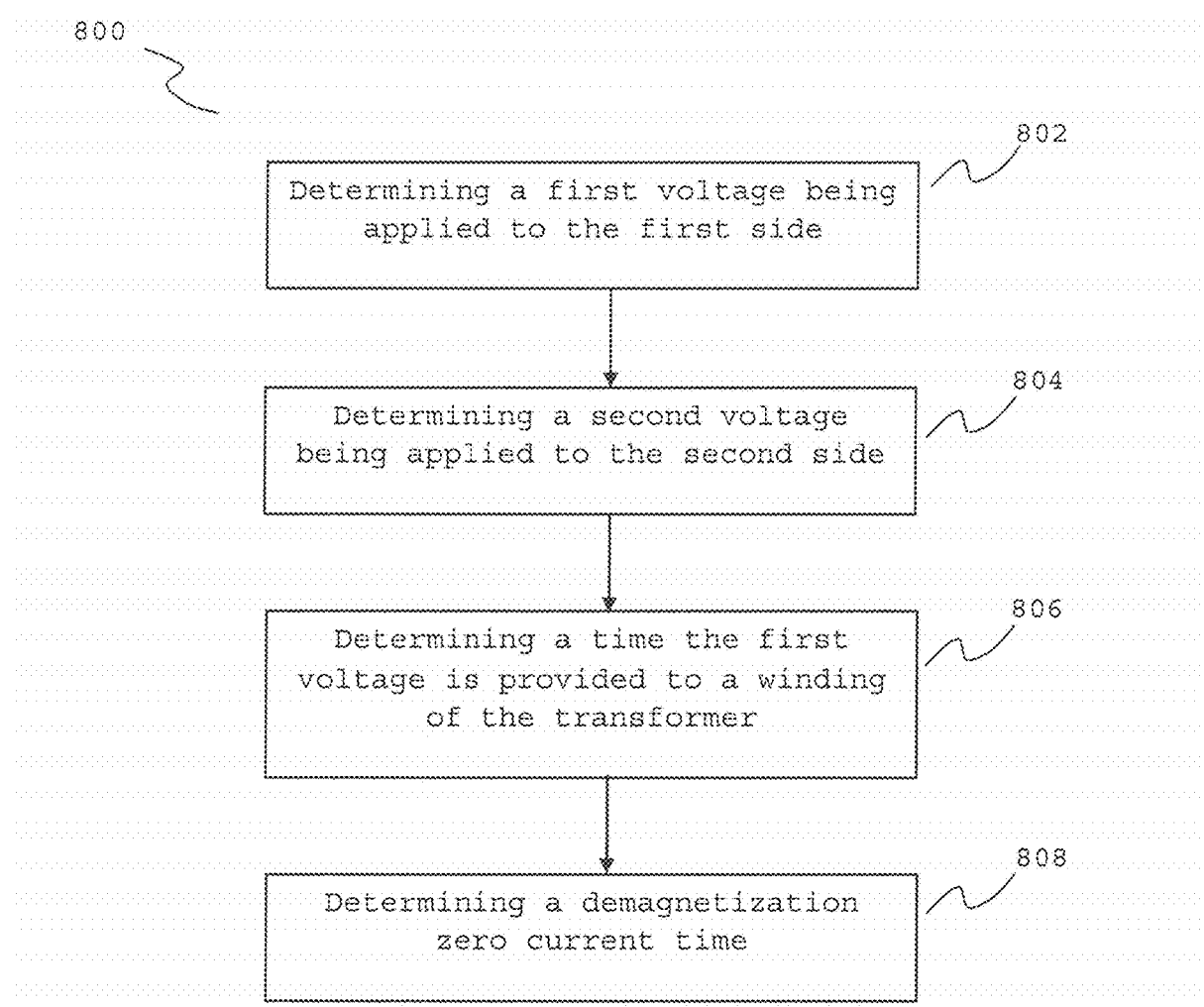

METHOD AND A CONTROLLER FOR DETERMINING A DEMAGNETIZATION ZERO CURRENT TIME FOR A SWITCHED MODE POWER SUPPLY

TECHNICAL FIELD

Various embodiments relate to a method for determining a demagnetization zero current time for a switched mode power supply. Furthermore, various embodiments relate to a method and a controller for controlling a switched mode power supply.

BACKGROUND

Flyback converter topologies which include a transformer providing galvanic isolation between the input and the output of the converter are commonly used in switched-mode power supplies (SMPS) of both AC/DC and DC/DC kind. Flyback topologies offer a good ratio of system costs to device performance over a wide output power range from 1 W to 100 W and more. However, when a transition to higher power classes is made, a limitation of the maximal efficiency to be achieved becomes more significant in comparison to other topologies and corresponding driving methods of switched mode power supplies. There are multiple parts in a flyback type appliance which affect the overall efficiency of the appliance in a limiting manner due to their respective power losses.

The voltage conversion in SMPS based on flyback topologies is based on an operating scheme basically involving two steps. In a first step, a power switch provided in the circuit including a primary side of the transformer is closed and energy provided at an input of the converter is stored in the magnetic field of the transformer. In a second step, the power switch on the primary side of the transformer is opened and a power switch on the secondary side of the transformer is closed, whereby the energy stored in the magnetic field of the transformer drives a demagnetization current through a secondary side of the transformer until the transformer is demagnetized.

During the conduction phase of the demagnetization current through the rectifying diode, the diode forward voltage drop is responsible for a power loss. The demagnetization currents rise drastically for higher powers and in appliances with small output voltages and therefore the corresponding power loss in the rectifying diode also increases.

The problem of the power loss in a diode inherent in its forward voltage drop can be tackled in various ways. One possible approach is the synchronous rectification scheme, according to which, on the secondary side of the transformer, the function of the rectifying diode in conducting state is replaced by a power switch which is switched in predefined time intervals and is driven in sync with the power switch on the primary side of the converter. The power switch on the secondary side of the transformer can avoid the forward voltage drop of the rectifying diode in conducting operation and the power loss connected therewith.

SUMMARY

In accordance with various embodiments, a method is provided for determining a demagnetization zero current time for a switched mode power supply having a transformer, a first side and a second side being galvanically separated from each other and a switched mode power supply controller, the method including: determining a first voltage being applied to one side of the transformer; determining a second voltage provided at the other side of the transformer; determining a time the first voltage is provided to a winding of the transformer; and determining, by a circuit located on the same side of the transformer as the switched mode power supply controller, the demagnetization zero current time using the determined first voltage, the determined second voltage and the determined time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows a flow diagram illustrating the method to control the operation of the switched mode power supply circuit according to various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

A flyback (power) converter usually includes a transformer which provides galvanic isolation between the input(s) and the output(s) of the converter. A flyback converter circuit may include two main sides or circuits. In the following, the terms "primary side", "primary circuit" and "primary circuit side" may refer to the side or part of the flyback converter circuit which is connected to or includes the input(s) of the flyback converter and is therefore galvanically separated from the side or part of the flyback converter circuit which is connected or includes the output(s) of the flyback converter circuit. In analogy, the term "secondary side", "secondary circuit" and "secondary circuit side" may refer to the side or part of the flyback converter circuit which is connected to or includes the output(s) of the flyback converter and is therefore galvanically separated from the side or part of the flyback converter circuit which is connected or includes the input(s) of the flyback converter circuit.

In general, controlling of the power switch on the secondary side of the converter may be executed directly from the secondary side of the converter or from the primary side of the converter, as shall be briefly outlined in the following on the basis of architectures already known.

Figure 1A:
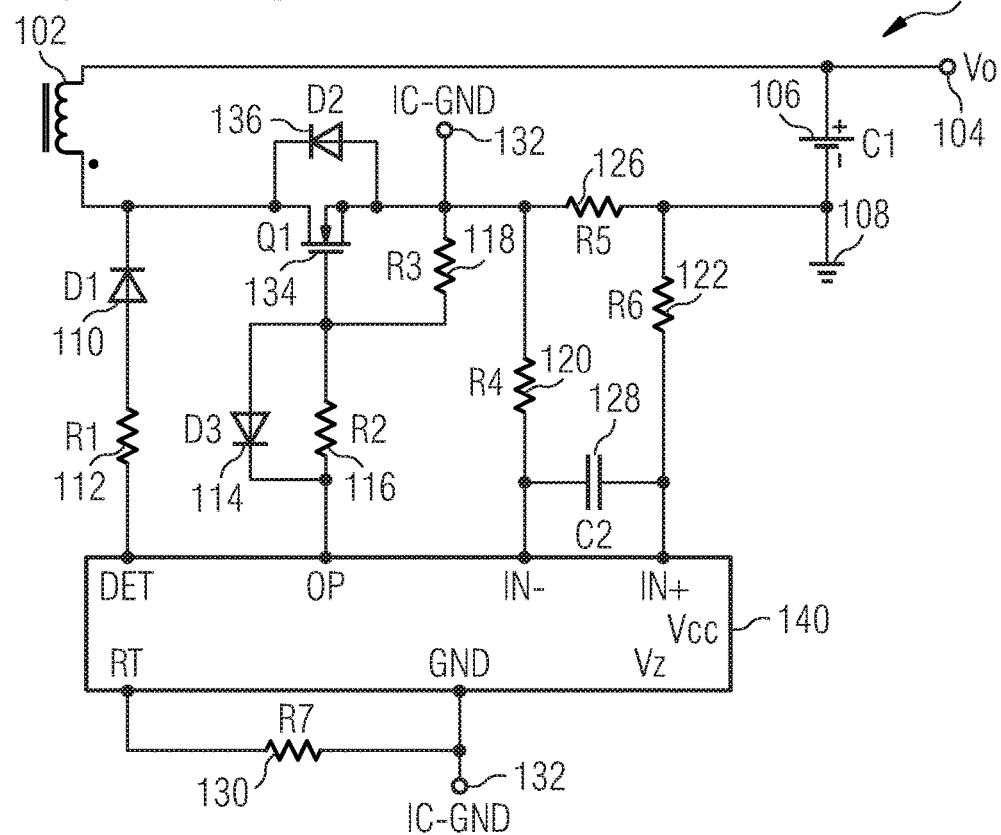
FIG. 1A shows a secondary side circuit of a conventional flyback power converter.

In FIG. 1A a secondary side circuit 100 of a flyback power converter is shown. The secondary side circuit 100 of a flyback power converter includes a secondary winding 102 which is magnetically coupled to a primary winding (not shown in the figure) and together with the primary winding forms a transformer of the flyback power converter. One end of the secondary winding 102 is connected to an output terminal 104 of the secondary side circuit 100 to which an external load can be connected. One side of a first capacitor 106 is connected to the electrical path between the output terminal 104 and the secondary winding 102, the other side of the first capacitor 106 is connected to a reference potential 108, for example the ground potential. The other end of the secondary winding 102 is connected to a drain of a MOSFET (metal-oxide-semiconductor field effect transistor) transistor 134 and to a terminal DET of a secondary side synchronous rectification controller 140 (hereinafter referred to as the controller 140) via a series arrangement of a first diode 110 and a first resistor 112. The gate of the MOSFET transistor 134 is connected to a terminal OP of the controller 140 via a second resistor 116, wherein a second diode is coupled in parallel to the second resistor 116 between the gate of the MOSFET transistor 134 and the terminal OP of the controller 140. The gate of the transistor 134 is coupled to a source of the same via a third resistor 118 and to a terminal IN− of the controller 140 via a fourth resistor 120. The source of the transistor 134 is further connected to the drain of the same via a second diode 136, to the reference potential 108 via a fifth resistor 126 and to a terminal IN+ of the controller 140 via a the fifth resistor 126 and a sixth resistor 122. A node to which the source of the MOSFET transistor and the third resistor 118 are connected is coupled to an integrated circuit ground potential 132. A second capacitor 128 is coupled between the IN− terminal and the IN+ terminal of the controller 140. A terminal RT of the controller 140 is coupled to an integrated circuit ground potential 132 via a seventh resistor 130, a terminal GND of the controller 140 is directly coupled to the integrated circuit ground potential 132.

The secondary side circuit 100 of a flyback power converter shown in FIG. 1A includes the controller 140 which controls the switching times of the MOSFET transistor 134. The fifth resistor 126 is used as a current sensing resistor via which the controller 140 is able to sense a demagnetization current flowing through the secondary winding 102 of the transformer when the power switch on the primary side (not shown in FIG. 1A) of the flyback power converter is opened and the MOSFET transistor 134 is closed. The MOSFET transistor 134 acts as a power switch on the secondary side of the flyback power converter and provides synchronous rectification functionality. Once the demagnetization current flowing through the secondary winding 102 falls below zero, i.e. when a zero current crossing occurs, the voltage sensed at the terminal IN+ is lower than the voltage sensed at the terminal IN− of the controller 140. The detection of such an event triggers a signal by which the transistor 134 is turned off to prevent a further current flow through the secondary side circuit 100 which may discharge the first capacitor 106 in reverse direction, e.g. in a direction opposed to its inherent polarity. The fourth resistor 120 and the sixth resistor 122 can be used to set the current level at which the MOSFET transistor 134 is turned off. The state of the power switch provided in the primary side circuit (not shown in FIG. 1A) of the flyback power supply is sensed via the terminal DET of the controller 140, which is connected to the secondary winding 102 of the transformer via the first diode 110 and the first resistor 112. Once the power switch on the primary side circuit is turned on, a current flow through the primary winding of the transformer induces a voltage in the secondary winding 102 of the transformer such that a high voltage is sensed at the terminal DET of the controller 140. Such an event marks the beginning of a new switching cycle.

Figure 1B:
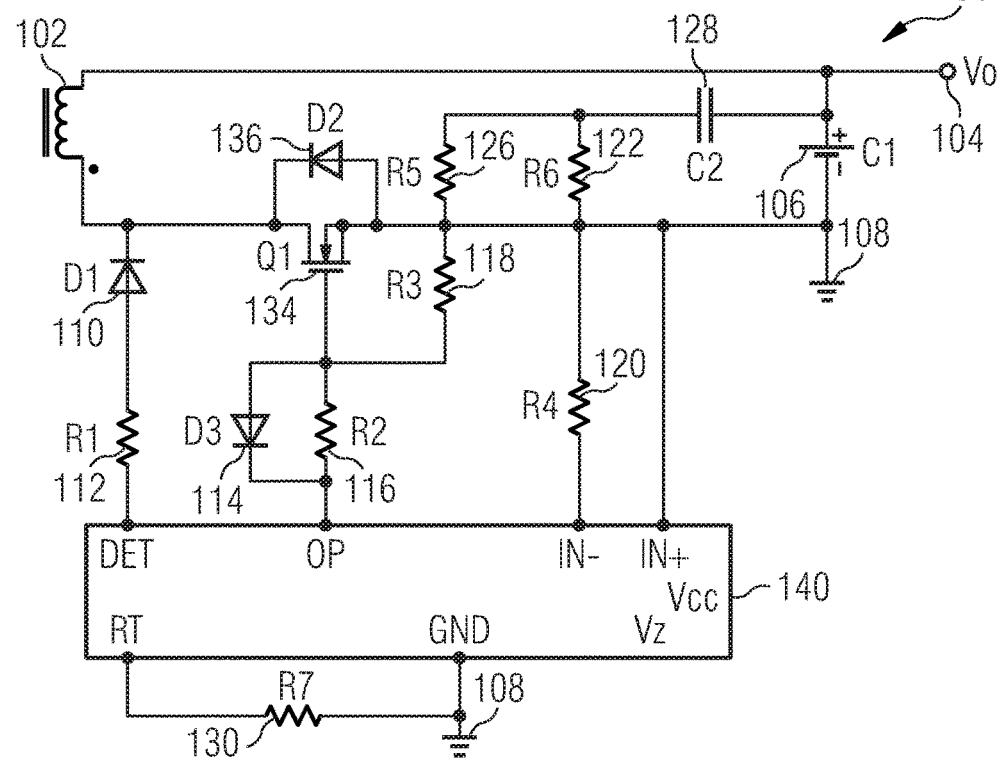
FIG. 1B shows a further secondary side circuit of a conventional flyback power converter.
Figure 2A:
FIGS. 2A to 2D show various signal sequences during the operation of the conventional flyback power converter shown in FIG. 1A or FIG. 1B.
Figure 2B:
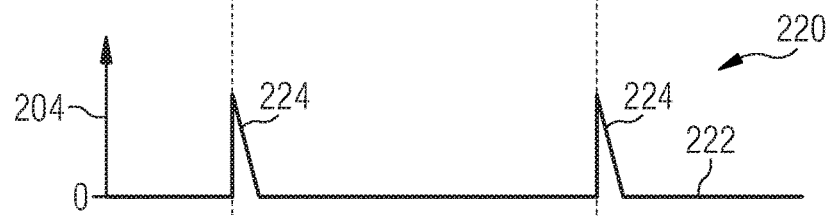
Figure 2C:
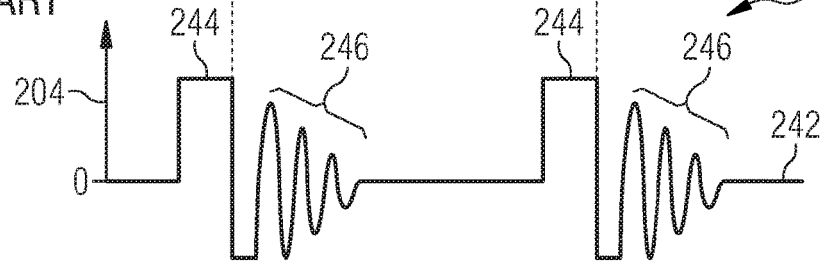
Figure 2D:
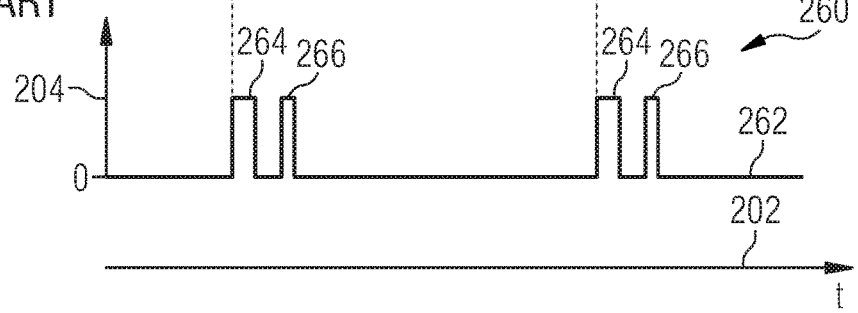

A slightly altered current sensing method is explained on the basis of a secondary side circuit 150 of a flyback power converter shown in FIG. 1B. The secondary side circuit 150 is similar to the secondary side circuit 100 shown in FIG. 1A. Therefore the same elements or elements having the same functionality and arrangement within the will be labelled with the same reference numbers and for the sake of brevity will not be described again. In the secondary side circuit 150 of FIG. 1B the fifth resistor 126, the sixth resistor 122 and the second capacitor 128 have been relocated from the position as shown in the secondary side circuit 100 of FIG. 1A. The second capacitor 128, instead of being coupled between the terminal IN− and the terminal IN+ of the controller 140, is coupled to the electrical path between the first capacitor 106 and the output 104 of the secondary side circuit 150 with its one side, the other side thereof is coupled to the terminal IN+ of the controller 140 via the sixth resistor 122, to the source of the MOSFET transistor 134 via the fifth transistor 126 and to the terminal IN− of the controller 140 via the fifth resistor 126 and the fourth resistor 120. This altered configuration provides a high pass filter including the fifth resistor 126 and the second capacitor 128 to sense via the fifth resistor 126 the demagnetization current flowing through the secondary winding 102 of the transformer.

In order to drive the power switch in the form of the MOSFET transistor 134 to provide synchronous rectification, the controller 140 arranged on the secondary side circuit of a flyback power converter as shown in FIG. 1A or in FIG. 1B requires an additional PWM (pulse with modulation) circuit, which increases the system costs. Furthermore, due to the synchronization signal of the primary switch arranged on the primary side circuit (not shown in FIG. 1A and FIG. 1B) of the converter is sensed via the secondary winding 102 of the transformer, situations might occur in which the MOSFET transistor 134 is switched on at a false point in time. The origin of a faulty trigger signal will be explained on the basis of the diagrams shown in FIGS. 2A, 2B, 2C and 2D. All diagrams share a common x-axis 202 which denotes time. The y-axis 204 denotes an amplitude of a signal shown in the respective diagram. In diagram 200, a driving signal 206 for the power switch provided in the primary side circuit of the flyback power converter of FIG. 1A and FIG. 1B is shown. An interval during which the driving signal 206 is at a high level denotes a time interval in which the power switch in the primary side circuit is turned on. In diagram 200 two pulses 208 are present during which the power switch in the primary side circuit remains closed. Diagram 220 shows the course of the demagnetization current 222 on the secondary circuit side of the flyback power converter shown in FIG. 1A and FIG. 1B. Whenever the driver signal 206 returns to its low value, i.e. whenever the power switch provided in the primary side circuit is opened, the demagnetization current 222 through the secondary winding 102 of the transformer spikes and starts to decrease linearly immediately thereafter to its zero value. Such an event can be observed to occur twice in diagram 220 in the form of two pulses 224 having a triangular shape. In diagram 240, a potential 242 which is sensed at the terminal DET of the controller 140 is displayed. During the time the driving signal 206 is at its high value (i.e. for the duration of the pulses 208 in diagram 200), a positive potential pulse 244 is sensed at the terminal DET of the controller 140. During this time there is no current flow through the secondary winding 102. When the driving signal 206 returns to its low value, i.e. when the power switch provided in the primary side circuit of the flyback power converter is turned off, the demagnetization current 222 flowing through the secondary winding 102 reverses the polarity of the voltage which is sensed at the terminal DET of the controller 140. The transition of the voltage 242 from a high value to a low value sensed at the terminal DET of the controller 140 triggers a driving signal pulse 264 on the driving signal 262 for MOSFET transistor 134 as shown in diagram 260. When the transformer is demagnetized, the demagnetization current 222 drops to its zero value. However, due to ringing 246 present on the windings of the transformer and therefore also detected at the terminal DET of the controller 140, a false driving signal pulse 266 for the MOSFET transistor 134 may be triggered. This undesirable situation may be prevented by providing an RC filter in the electrical path connecting the DET terminal of the controller 140 with the primary winding 102 in the form of an additional filter capacitor connected between the DET terminal of the controller 140 and the first resistor 112 with its one side, and to the reference potential with its other side.

Figure 3:
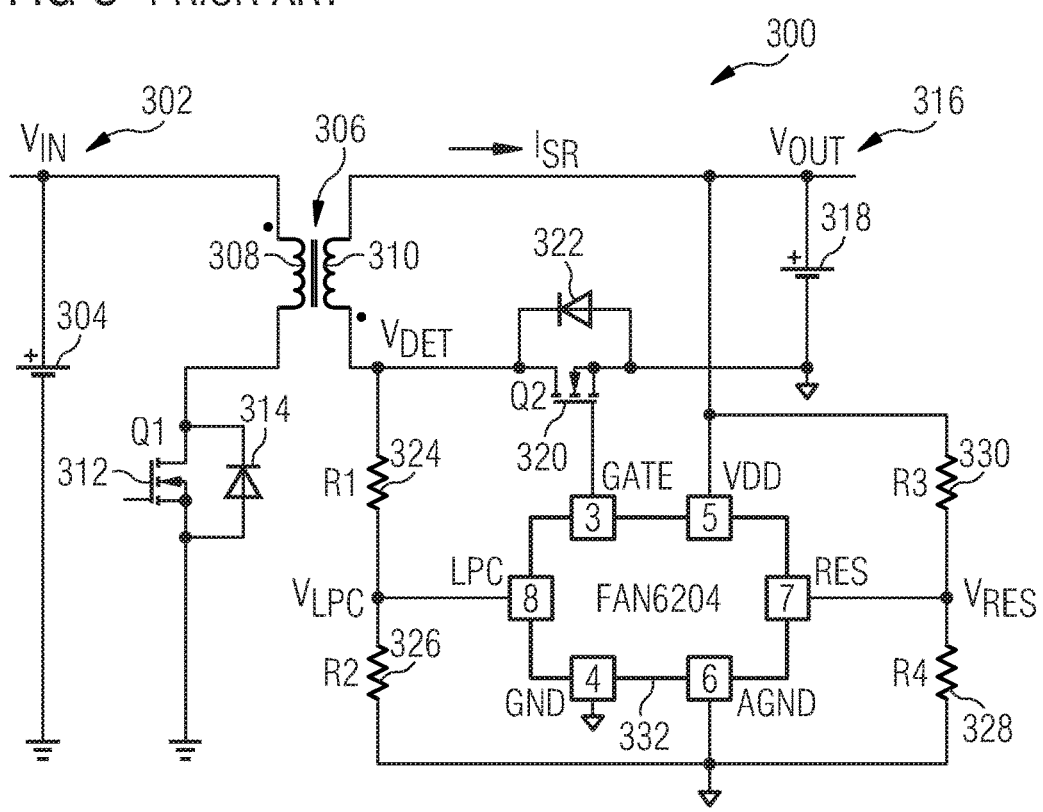
FIG. 3 shows a conventional flyback power converter circuit.

In FIG. 3 a flyback power converter circuit 300 is shown which also includes a synchronous rectification controller 332 (will be referred to as the controller 332 in the following) arranged on the secondary side of the flyback power converter circuit 300. The controller 332 makes use of a linear timing predict method to determine the turn-on time of a second power switch 320 provided in the secondary side circuit of the flyback power converter circuit 300 by measuring the turn-on time of a first power switch 312 provided in the primary side circuit of the flyback power converter circuit 300 and the amplitude of input voltage. The underlying principle for the linear timing predict method used in the controller 332 is the volt-second balance theorem.

The flyback power supply converter circuit 300 shown in FIG. 3 includes an input terminal 302 which is connected to one end of a primary winding 308 of a transformer 306, wherein a first capacitor 304 is coupled between the electrical path between the input 302 and the one end of the primary winding 308 and a reference potential, for example the ground potential. The other end of the primary winding 308 is connected to a drain of the first transistor 312, a source of the same is coupled to the reference potential. A first diode 314 is coupled in parallel to the first transistor 312 between its source and drain. The elements described so far form the primary side circuit of the flyback power converter circuit 300 shown in FIG. 3. The elements forming the secondary side circuit of the flyback power converter circuit 300 will be described in the following.

The primary winding 308 of the transformer 306 is magnetically coupled to a secondary winding 310 of the transformer 306. One end of the secondary winding 310 is coupled to an output terminal 316 and to a terminal VDD of the controller 332. That same end of the secondary winding 310 is also coupled to a reference potential via a series arrangement of a third resistor 330 and a fourth resistor 328. The electrical path between the third resistor 330 and the fourth resistor 328 is coupled to a terminal RES of the controller 332. The other end of the secondary winding 310 is coupled to a drain of the second transistor 320 which provides the functionality of synchronous rectification and to the reference potential via a series arrangement of a first resistor 324 and a second resistor 326. The electrical path between the first resistor 324 and the second resistor 326 is coupled to an LPC terminal of the controller 322. The gate of the second transistor 320 is coupled to a terminal GATE of the controller 332. A GND terminal and an AGND terminal of the controller 332 are coupled to the reference potential. A second diode 322 is coupled in parallel to the second transistor 320 between its drain and source. One side of a second capacitor 318 is coupled to the output terminal 316, the other side of the second capacitor 318 is coupled to the reference potential and the source of the second transistor 320.

The controller 332 uses the terminal LPC and the voltage divider including the first resistor 324 and the second resistor 326 to sense the voltage across the secondary winding 310 of the transformer 306. The terminal RES and the voltage divider including the third resistor 330 and the fourth resistor 328 are used to sense the output voltage provided at the output terminal 316. Using those voltages and the on-time of the first transistor 312 the controller 332 is able to determine the on-time of the second transistor 320 on the basis of the volt-second balance theorem which will be explained later in more details.

Since the flyback power converter circuit 300 shown in FIG. 3 makes use of the volt-second balance theorem in order to determine the turn-on time of the second transistor 322, issues with false triggers due to ringing which maybe present on the transformer windings as explained in the case of the flyback power converters shown in FIG. 1A and FIG. 1B may be avoided. However, with the necessity of an additional PWM circuit (in addition to a PWM circuit in the primary side circuit for driving the first transistor 312) which is included in the controller 332 in the secondary side circuit of the flyback power supply circuit 300 for driving the second transistor 320, the problem of increased system costs remains.

Figure 4:
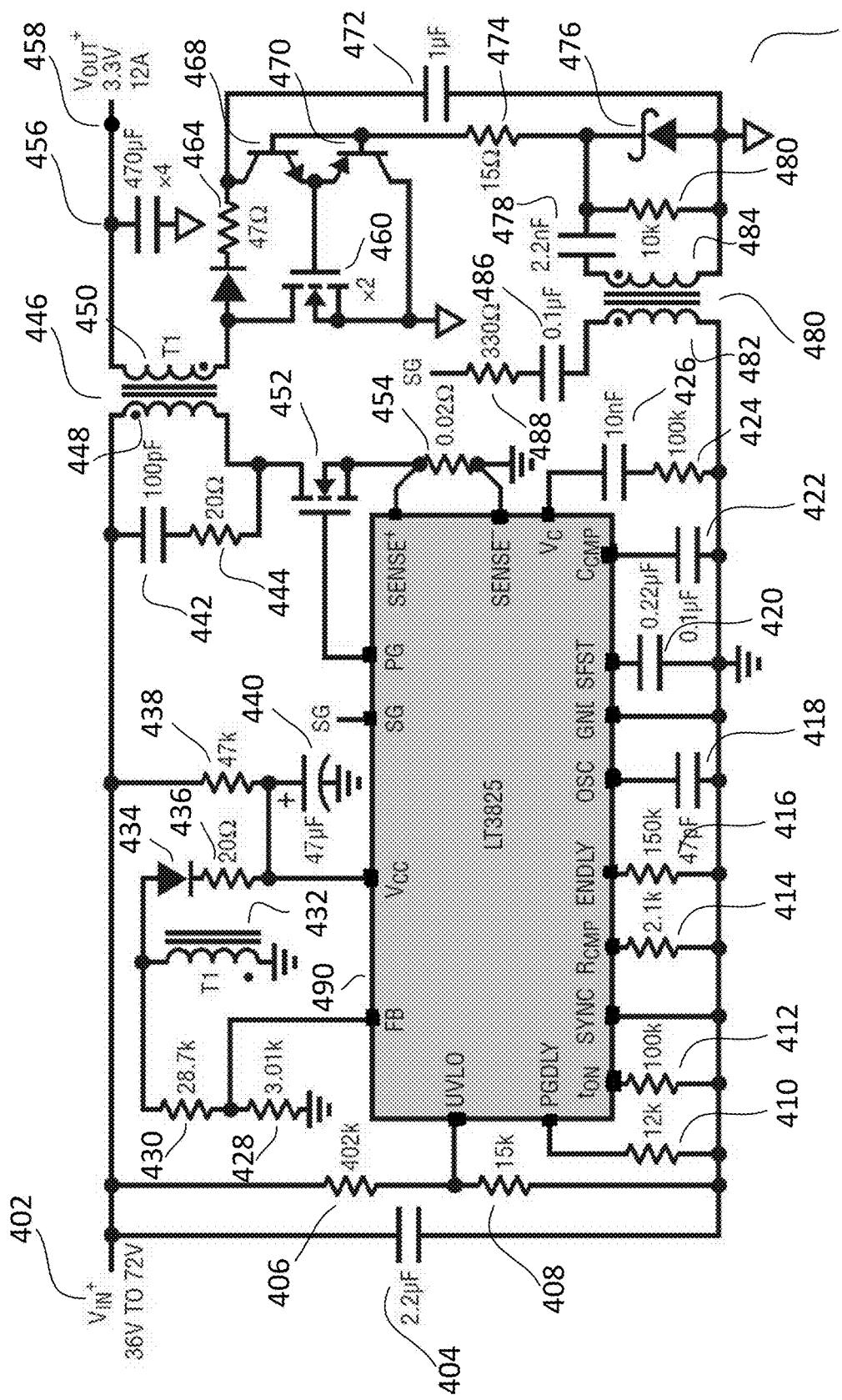
FIG. 4 shows a further conventional flyback power converter circuit.

In FIG. 4 a flyback power converter circuit 400 is shown which includes a controller 490 for driving a first power switch 452 and a second power switch 460, the latter providing synchronous rectification functionality. In contrast to the concepts of flyback power converters shown in FIGS. 1A and 1B or FIG. 3, the controller 490 is provided on the primary circuit side of the converter circuit 400 as shown in FIG. 4. The converter circuit 400 includes an input terminal 402 which is connected to one end of a primary winding 448 of a first transformer 446. The input terminal 402 is further connected to a reference potential, for example the ground potential, via a first capacitor 404 and to a terminal UVLO of the controller 490 via a sixth resistor 406, wherein the terminal UVLO of the controller 490 is connected to the reference potential via a fifth resistor 408. The input terminal 402 is connected to the reference potential via a series arrangement comprising a fourth resistor 438 and a third capacitor 440, wherein the electrical path between the fourth resistor 438 and the third capacitor 440 is connected to a terminal VCC of the controller 490. The terminal VCC of the controller 490 is connected to one end of an auxiliary winding 432 via a series arrangement including a third resistor 436 and a first diode 434, the other end of the auxiliary winding 432 is connected to the reference potential. The auxiliary winding 432 is magnetically coupled to the first transformer 446. A terminal FB of the controller 490 is connected to the reference potential via a second resistor 428 and to the one end of the auxiliary winding 432 via a first resistor 430. The other end of the primary winding 448 of the transformer 446 is connected to the input terminal 402 via a series arrangement including a thirteenth resistor 444 and a fourth capacitor 442 and to a drain of a first transistor 452. A gate of the first transistor 452 is connected to a terminal PG of the controller 490 and a source of the first transistor 452 is connected to the reference potential via a twelfth resistor 454. The electrical path between the source of the first transistor 452 and the twelfth resistor 454 is coupled to a terminal SENSE+ of the controller 490 and the electrical path between the reference potential and the twelfth resistor 454 is coupled to a terminal SENSE− of the controller 490. A terminal SG of the controller 490 is coupled to one end of a primary winding 482 of a second transformer 480 via a series arrangement including a fifteenth resistor 488 and an eighth capacitor 486. The other side of the primary winding 482 of the second transformer 480 is coupled to the reference potential. A terminal VC of the controller 490 is coupled to the reference potential via a series arrangement including a seventh capacitor 426 and an eleventh resistor 424. A terminal CCMP of the controller 490 is coupled to the reference potential via a sixth capacitor 422. A terminal SFST of the controller 490 is coupled to the reference potential via a fifth capacitor 420. A terminal GND of the controller 490 is coupled to the reference potential. The terminal OSC of the controller 490 is coupled to the reference potential via a second capacitor 418. A terminal ENDLY of the controller 490 is coupled to the reference potential via a tenth resistor 416. A terminal RCMP of the controller 490 is coupled to the reference potential via a ninth resistor 414. The terminal SYNC is coupled to the reference potential. A terminal $t_{ON}$ is coupled to the reference potential via an eighth resistor 412. A terminal PGDLY is coupled to the reference potential via a seventh resistor 410. The elements described so far form the primary side circuit of the converter circuit 400 shown in FIG. 4 or, in other words, are allocated on the primary side of the converter circuit 400. The rest of the elements to be described in the following in the converter circuit 400 shown in the FIG. 4 form the secondary side circuit.

The secondary side of the converter circuit 400 includes a secondary winding 450 of the first transformer 446 which is galvanically coupled to the first winding 448 of the first transformer 446 arranged on the primary circuit side. One end of the secondary winding 450 is coupled to an output terminal 458 and to one side of an eleventh capacitor 456, the other side of which is coupled to the reference potential. The other side of the secondary winding 450 is coupled to a second diode 462 and to one end of a fourteenth resistor 464. The other end of the fourteenth resistor 464 is coupled to a tenth capacitor 472 which in turn is coupled to the reference potential and to the reference potential via a series arrangement including a third transistor 468 and a fourth transistor 470. A base of the third transistor 468 and a base of the fourth transistor 470 are coupled to the reference potential via a series arrangement including a sixteenth resistor 474 and a third diode 476. The electrical path between the third transistor 468 and the fourth transistor 470 is coupled to a gate of a second transistor 460. A source of the second transistor is coupled to the reference potential, a drain of the second transistor is coupled to the other end of the secondary winding 450 of the first transformer 446. The electrical path between the sixteenth resistor 474 and the third diode 476 is coupled to one end of a secondary winding 484 of the second transformer 480 via a ninth capacitor 478 and to the reference potential via a seventeenth resistor 480. The other side of the second winding 484 of the second transformer 480 is coupled to the reference potential.

The control method implemented in the controller 490 only supports a CCM (continuous current mode) of a fixed frequency. This means, that only a fixed relation between the on-times and off-times of the power switch on the primary circuit side, i.e. the first transistor 452, and the secondary power switch, i.e. the second transistor 460, can be chosen and used. The fixed relation is independent of the load connected to the output terminal 458 of the converter circuit 400 or the input voltage supplied at the input terminal 402 of the converter circuit 400. With the architecture presented in FIG. 4 a DCM (discontinuous conduction mode) is not possible. In general, in a CCM the demagnetization current in the winding of the transformer on the secondary side circuit never goes to zero between switching cycles. In a DCM the transformer may be fully demagnetized and the demagnetization current through the winding of the transformer on the secondary side circuit may drop to zero during part of the switching cycle.

Figure 5A:
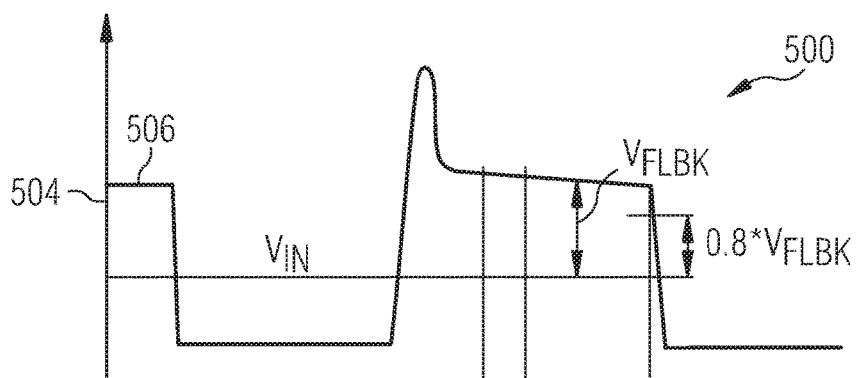
FIGS. 5A to 5C show various signal sequences which are output by the controller of the conventional flyback power converter circuit shown in FIG. 4.
Figure 5B:
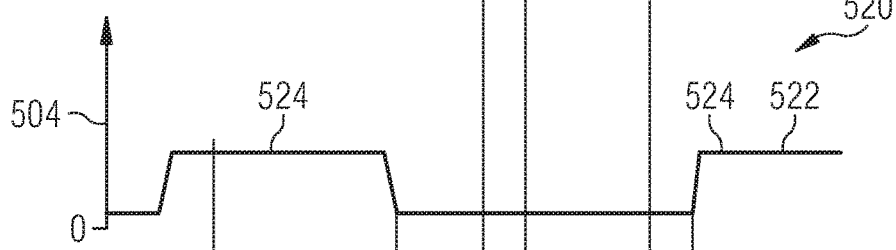
Figure 5C:
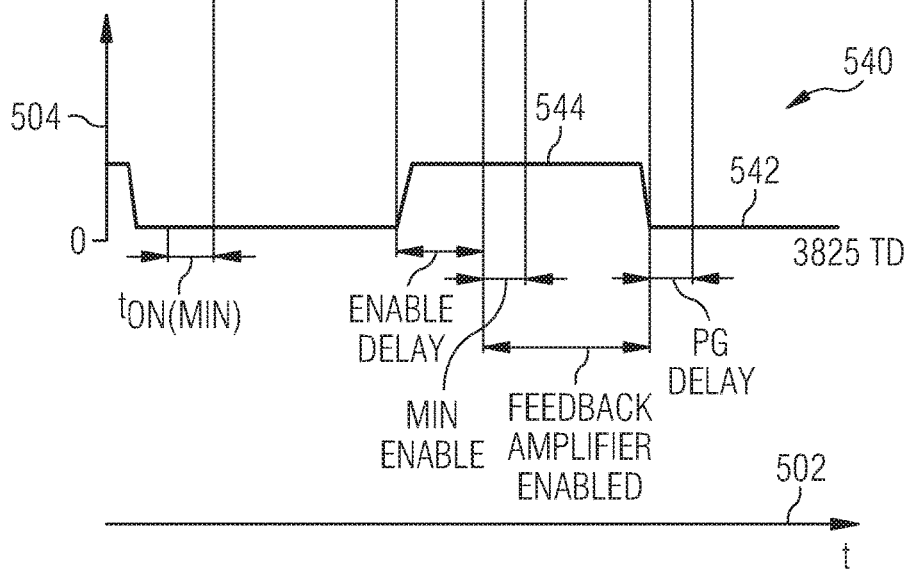

Various signal sequences which are output by the controller 490 of the converter circuit 400 shown in FIG. 4 are displayed in diagrams in FIGS. 5A to 5C. All three diagrams share a common time axis, i.e. the x-axis 502. The y-axis 504 in each of the diagrams denotes an amplitude of a respective signal. In diagram 500 of FIG. 5A the graph represents the drain voltage 506 of the first transistor 452 arranged on the primary circuit side. In diagram 520 of FIG. 5B the graph shows a first gate driver signal 522 which is output at the terminal PG of the controller 490 and provided to the gate of the first transistor 452. In diagram 540 of FIG. 5C the graph shows a second gate driver signal 542 provided at the terminal SG of the controller 490, which is transmitted to the secondary side circuit of the converter circuit 400 via the second transformer 480 and applied to the gate of the second transistor 460.

A high value of the first gate driver signal 522 and the secondary side gate driver signal 542 corresponds to an on-state of the first transistor 452 and the second transistor 460, respectively. From diagram 520 and diagram 540 it can be seen that the first transistor 452 and the second transistor are turned on and off in a mutually exclusive manner. During operation of the converter circuit 400 the controller 490 measures the current through the first winding 448 of the first converter 446 via the terminal SENSE+ and the terminal SENSE−. When the second gate driver signal 542 at the terminal SG of the controller 490 is raised to a high value and transmitted from the primary side circuit to the secondary side circuit of the converter circuit 400 via the second transformer 480, the second transistor 460 is turned on.

During an on-state pulse 544 which corresponds to a high value of the second gate driver signal 542 in diagram 540 in FIG. 5C, the second transistor 460 providing synchronous rectification remains activated. Depending on whether the first transistor 452 or the second transistor 460 is activated, the drain voltage 506 of the first transistor is at a negative value or a positive value as shown in diagram 500 in FIG. 5A.

In accordance with various embodiments a method and a device are provided which allow for a reduction of the power loss due to the use of a rectification diode provided in the secondary side circuit of the transformer in a flyback power converter circuit. In various embodiments a flyback converter circuit is provided, wherein the synchronous rectification is controlled from the primary side circuit of the converter, a concept which was already explained on the basis of the converter circuit 400 shown in FIG. 4. However, in contrast to that converter circuit 400, the controller circuit including a controller for controlling a switched mode power supply according to various embodiments may be also operated in discontinuous current mode and in a quasi-resonant mode.

The method and the controller for controlling a switched mode power supply may make use the volt-second balance theorem in order to determine the on-time of a switch, such as a transistor, provided in the secondary side circuit of a switched mode power supply based on a flyback converter topology. Thus, the commonly used rectification diode may be replaced by a switch providing synchronous rectification. A switched mode power supply using the controller for controlling the switched mode power supply according to various embodiments may have the advantage that, when compared to the switched mode power supply circuits presented in FIG. 1A, FIG. 1B and FIG. 3, only one PWM circuit may be necessary, which may be provided in the controller according to various embodiments, wherein the controller may be provided on the primary circuit side of the switched mode power supply. The flyback converters presented in FIG. 1A and FIG. 1B require a second PWM controller on the secondary circuit side which increases system costs. Furthermore, the controller and the method to control a switched mode power supply offer the possibility of an increase of the efficiency in quasi-resonant operation mode.

Figure 6:
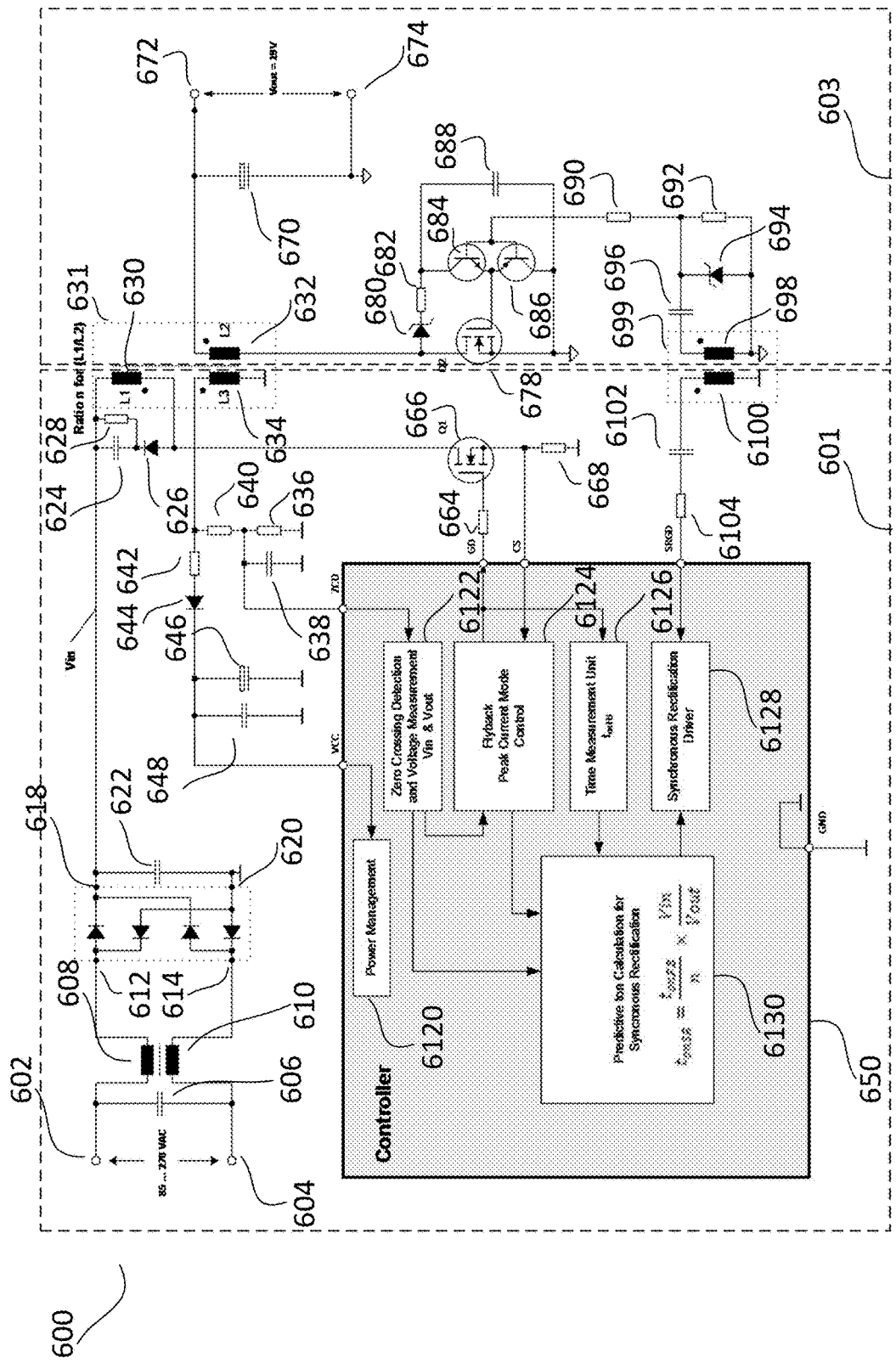
FIG. 6 shows a switched mode power supply circuit including a controller for controlling a switched mode power supply according to various embodiments

In FIG. 6 a switched mode power supply circuit including a controller for controlling a switched mode power supply according to various embodiments is shown. The switched mode power supply circuit 600 includes a first input 602 and a second input 604, to which an input voltage may be applied, an AC input voltage in the range from 85 V to 270 V, for example. The first input 602 may be coupled to a first side of a first inductor 608 and the second input 604 may be coupled to a first side of a second inductor 610. A first capacitor 606 may be coupled in parallel between the first input 602 and the second input 604. The first inductor 608 and the second inductor 610 may be magnetically or inductively coupled to one another. For example, the inductors may be provided in the form of coils which may be connected by a core or wrapped around a core including a material with a high permeability, such as iron, mu-metal or steel, in order to provide a magnetic coupling between the two coils. A second side of the first inductor 608 may be coupled to a first input 612 of a full wave rectification circuit 616 which may be configured to provide rectification functionality by the means of four diodes. A second side of the second inductor 610 may be coupled to a second input 614 of the full wave rectification circuit 616. A first output 618 of the full wave rectification circuit 616 may be coupled to a first side of a third inductor 630 and via a second capacitor 622 to a reference potential, for example the ground potential. The side of the second capacitor 622 which is coupled to the reference potential is further coupled to a second output 620 of the full wave rectification circuit 616. The first output 618 of the full wave rectification circuit 616 may be further coupled to the reference potential via a series arrangement including a third capacitor 624, a first diode 626, a first switch 666, for example a MOSFET transistor, and a first resistor 668. A second resistor 628 may be coupled in parallel to the third capacitor 624. The other side of the third inductor 630 may be coupled to the electrical path between the first diode 626 and the first transistor 666. The third inductor 630 may be magnetically coupled to a fourth inductor 634 and to a fifth inductor 632, all three inductors being parts of a first transformer 631. The magnetic coupling may be achieved in the same way as the magnetic coupling between the first inductor 608 and the second inductor 610 described above. One side of the fourth inductor 634 may be coupled to the reference potential, the other side thereof may be coupled to a first terminal VCC of a controller 650 via a series arrangement including a third resistor 642 and a second diode 644. One side of a fourth capacitor 646 may be coupled to the electrical path between the second diode 644 and the first terminal VCC of the controller 650. A fifth capacitor 648 may be coupled in parallel to the fourth capacitor 646 to the electrical path between the second diode 644 and the terminal VCC of the controller 650. The one side of the fourth inductor 634 may be further coupled to the reference potential via a series arrangement including a fourth resistor 640 and a fifth resistor 636. The electrical path between the fourth resistor 640 and the fifth resistor 636 may be coupled to the reference potential via a sixth capacitor 638 and to a second terminal ZCD of the controller 650. A control terminal of the first transistor 666, for example a gate, may be coupled to a third terminal GD of the controller 650 via a sixth resistor 664. The electrical path between a terminal the first transistor 666, or example a source of the first transistor 666, and the first resistor 668 may be coupled to a fourth terminal CS of the controller 650. The controller 650 may further include a fifth terminal SRGD which is coupled to one side of a sixth inductor 6100 via a series arrangement including a seventh resistor 6104 and a seventh capacitor 6102. The other side of the sixth inductor 6100 may be coupled to the reference potential. The sixth inductor 6100 may be magnetically coupled to a seventh inductor 698, the two inductors forming a second transformer 699. The elements described so far may be allocated to the primary side circuit 601 of the switched mode power supply circuit 600 which is galvanically separated from the secondary side circuit 603 thereof. The controller 650 further includes a sixth terminal GND which may be coupled to the reference potential. In the following, the elements included in the secondary side circuit 603 will be described.

One end of the seventh inductor 698 may be coupled to the reference potential, the other side thereof may be coupled to a terminal of a fourth transistor 684, for example to a base thereof, and a terminal of a third transistor 668, for example to a base thereof, via a series arrangement comprising an eighth capacitor 696 and an eighth resistor 690. One terminal of a third diode 694 may be connected to the electrical path between the eighth capacitor 696 and the eighth resistor 690, the other terminal thereof may be coupled to the reference potential. A ninth resistor 692 may be coupled in parallel to the third diode 694 to the electrical path between the eighth resistor 690 and the eighth capacitor 696. A second terminal of the fourth transistor 684, for example a collector of a pnp BJT (bipolar junction transistor), may be coupled to one side of the fifth inductor 632 via a series arrangement comprising a ninth resistor 682 and a fourth diode 680. A third terminal of the fourth transistor 684, for example an emitter of a pnp BJT, may be coupled to second terminal of the third transistor 686, for example an emitter of an npn BJT. A third terminal of the third transistor 686, for example a collector of an npn BJT, may be coupled the electrical path between the ninth resistor 682 and the second terminal of the fourth transistor 684 via a ninth capacitor 688. The second terminal of the third transistor 686 may be also coupled to a terminal of a second switch 678, for example a source of a MOSFET transistor, which may be coupled to the reference potential. A further terminal of the second transistor 678, for example a drain, may be coupled to the electrical path between the fourth diode 680 and the fifth inductor 632. A control terminal of the second transistor 678, for example a gate, may be coupled to the electrical path between the third terminal of the fourth transistor 684 and the second terminal of the third transistor 686. The other end of the fifth inductor 632 is coupled to a first output 672 of the switched mode power supply circuit 600. One side of a tenth capacitor 670 may be coupled to the electrical path between the first output 672 and the fifth inductor 632, the other end thereof may be coupled to a second output terminal 674 of the switched mode power supply circuit 600 and to the reference potential.

In the following, the functional structure within the controller 650 according to various embodiments will be described.

The controller 650 may include a power management circuit 6120 which may be connected to the first terminal VCC. The second terminal ZCD may be connected to an input of a zero crossing detection and voltage measurement circuit 6122. A first output of the zero crossing detection and voltage measurement circuit 6122 may be coupled to a first input of a synchronous rectification predictive regulation circuit 6130 and a second output of the zero crossing detection and voltage measurement circuit 6122 may be coupled to a first input of a flyback peak current mode control circuit 6124. A first output of the flyback peak current mode control circuit 6124 may be coupled to the third terminal GD and to an input of a time measurement circuit 6126. A second output of the flyback peak current mode control circuit 6124 may be coupled to a second input of the synchronous rectification predictive circuit 6130. A second input of the flyback peak current mode control circuit 6124 may be coupled to the fourth terminal CS of the controller 650. An output of the time measurement circuit 6126 may be connected to a third input of the synchronous rectification predictive calculation circuit 6130. An output of the synchronous rectification predictive calculation circuit 6130 may be coupled to an input of a synchronous rectification driver circuit 6128, an output of which may be connected to the fifth terminal SRGD.

In the following the functionality of the switched mode power supply circuit 600 will be explained. An input voltage of AC or DC type in the range from approximately 85 V to approximately 270 V may be provided between the first input 602 and the second input 604 of the circuit 600 and applied to the third inductor 630. By driving the switch 666 provided in the primary side circuit 601 in an appropriate manner, for example by applying a driving signal from the third terminal GD of the controller 650 including a PWM signal to the control terminal of the switch, the switch 666 may be closed or opened. Thereby, a current may flow through the winding of the third inductor 630 and energy may be stored in the resulting magnetic field within the first transformer 631. That is, a current flow through the third inductor 630 may be permitted when the switch 666 is closed (i.e. rendered into a conducting state); a current flow through the third inductor 630 is prevented when the switch 666 is not opened (i.e. rendered into a non-conducting state). The current flowing through the third inductor 630 builds up a magnetic field in the first transformer 631. When the first switch 666 is opened and the second switch 678 provided in the secondary side circuit 603 is closed thereupon, the magnetic field of the first transformer may induce a voltage across the fifth inductor 632 and a demagnetization current may flow through the fifth inductor 632 provided in the secondary side circuit 603 of the switched mode power supply circuit 600 and may charge the tenth capacitor 670 of the circuit 600 which serves as an output capacitor providing the output voltage. The on-times and the off-times of the second switch 678 may be controlled by the controller 650. A synchronous rectification driver signal may be output at the fifth terminal SRGD of the controller 650 and may be applied to the control terminal of the second switch 678, for example to the gate of the second transistor 678, via the second transformer 699.

The control method by which the controller 650 controls the operation of the switched mode power supply circuit 600 relies on the volt-second balance theorem which, in general terms, states that the voltage of an inductor is zero during a switching period in steady state. This means that the product of a charge voltage and a charge time, during which the charge voltage is provided to the inductor, is equal to the product of a discharge voltage and discharge time, during which the discharge voltage is induced across the inductor. In the switched mode power supply circuit 600 based on the flyback converter topology the charge voltage may be applied to the third inductor 630 in the form of the input voltage $V_{in}$. The discharge voltage may correspond to the output voltage $V_{out}$ multiplied with the ratio n of the number of windings between the inductors of the first transformer 631. The controller 650 may control the synchronous rectification process for the discontinuous current mode and the quasi-resonant operation mode of the switched mode power supply circuit 600, wherein the controller 650 may be arranged on the primary side circuit 601 as shown in FIG. 6. The input voltage and the output voltage may be sensed or detected via an auxiliary detection inductor, for example the fourth inductor 634, and provided to the zero crossing detection voltage circuit 6122 of the controller 650. The auxiliary inductor, which may be embodied by the fourth inductor 634, may be included in the transformer 631 and apart from being magnetically coupled to the third inductor 630 (or the windings thereof) may be also magnetically coupled to the second side of the transformer 631, for example the fifth inductor 632. The information about the input voltage and the output voltage may be gathered by sampling the voltage at the auxiliary detection inductor 634 in appropriate time intervals. However, the auxiliary detection inductor 634 may be replaced by a resistive divider and used for gathering the information about the input voltage (and the output voltage). The zero crossing detection and voltage measurement circuit 6122 may evaluate the voltage readings and may provide information about the input voltage and the output voltage of the circuit 600 to the synchronous rectification predictive calculation circuit 6130. The output of the flyback peak current mode control mode circuit 6124 which drives the first switch 666 on the primary side circuit 601 is connected to the time measurement circuit 6126. The time measurement circuit 6126 may evaluate the driving signal provided at the third terminal GD of the controller 650 and may determine or calculate therefrom the on-time $t_{onFB}$ of the first switch 666 and provide that value to the synchronous rectification predictive calculation circuit 6130. The synchronous rectification predictive calculation circuit 6130 is thereby provided with all three parameters needed in order to calculate or predict the on-time $T_{onSR}$ of the second switch 678 provided in the secondary side circuit side 603, for example the second transistor 678, such that synchronous rectification may be effectively performed.

The switched mode power supply circuit 600 according to various embodiments may be also operated in reverse, i.e. an input DC voltage may be applied to its first output 672 and its second output 674 and it may be transformed into an output DC output voltage which may be provided at its first input 602 and its second input 604. In the case of the power supply circuit 600 according to various embodiments being operated in reverse, it may be used to convert a lower input voltage into a higher DC output voltage. Then, the role of the first transistor 666 and the second transistor 678 would be inverted. That is, the on-time 764 of the second transistor 678 (corresponding to the synchronous rectification time $T_{OnSR}$) would be determined or preset by the controller 650 and the controller 650 could then calculate or predict the on-time 744 ($T_{OnFB}$) of the first transistor 666 accordingly. As in the previously described forward operation mode of the switched mode power supply circuit 600 according to various embodiments the required information about the input voltage $V_{in}$ and the output voltage $V_{out}$ may be obtained by the means of the fourth inductor 634 which, together with the zero crossing detection and voltage measurement circuit 6122 via the second terminal ZCD of the controller 650, is so to speak "monitoring" the voltage across or the current through any of the other inductors included in the first transformer 631.

In the following the operation of the controller 650 according to various embodiments will be described in more detail on the basis of diagrams shown in FIGS. 7A to 7D.

Figure 7A:
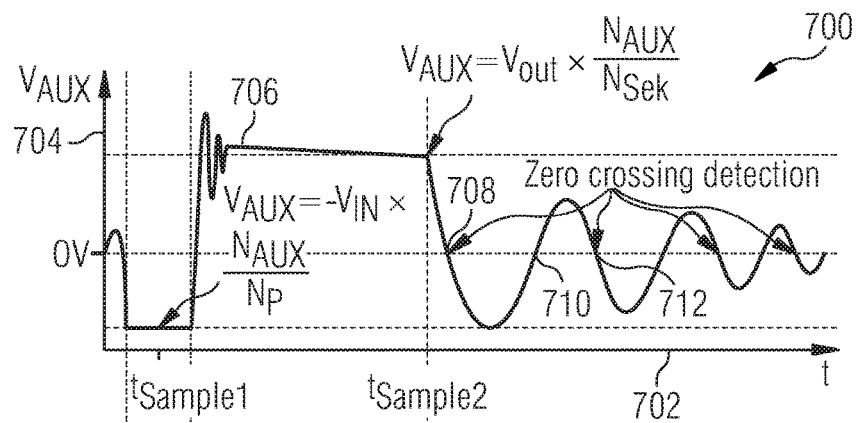
FIGS. 7A to 7D show various signal sequences in the form of voltages and currents during the operation of the switched mode power supply circuit according to various embodiments shown in FIG. 6.
Figure 7B:
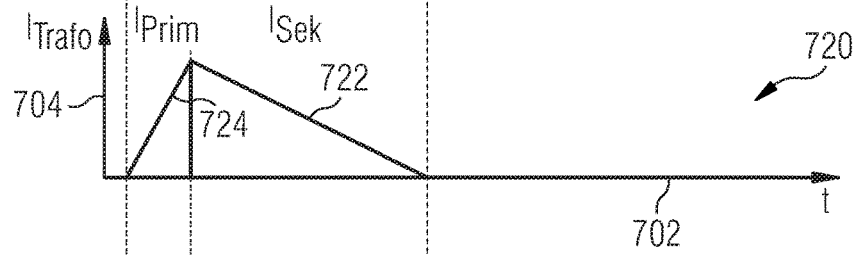
Figure 7C:
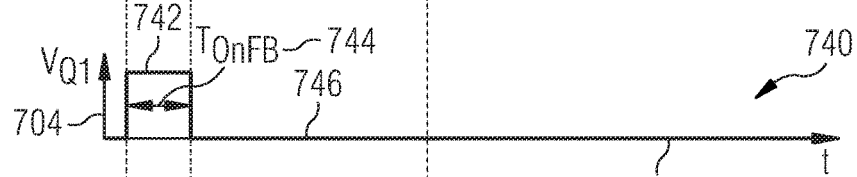
Figure 7D:
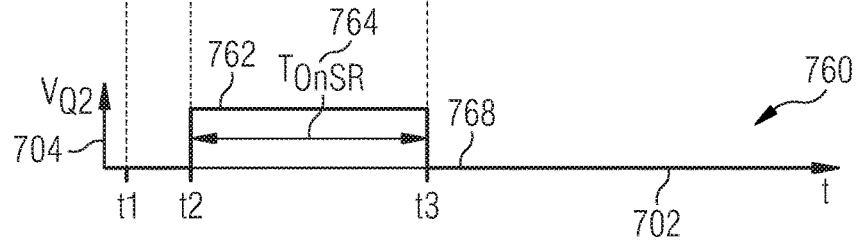

In FIGS. 7A to 7D various signal sequences in the form of voltages and currents are shown in respective diagrams. All four diagrams share a common x-axis 702 which denotes time. In FIG. 7A the diagram 700 shows a detection voltage 706 which may be detected or sensed at the second terminal ZCD of the controller 650 and corresponds to the voltage of the fourth inductor 634 in FIG. 6. Hence the y-axis 704 in diagram 700 denotes the amplitude of the detection voltage 706. In FIG. 7B the diagram 720 shows a first transformer current 726 including a primary side transformer current 724 which may correspond to a current through the third inductor 630 arranged on the primary side 601 of the switched mode power supply circuit 600 and a secondary side transformer current 722 which may correspond to a current through the fifth inductor 632 arranged on the secondary side 603 of the switched mode power supply circuit 600. Hence the y-axis 704 in diagram 720 denotes a current. In diagram 740 of FIG. 7C a driver signal 746 provided by the controller 650 at its third terminal GD is shown which may correspond to a gate driver signal applied to the gate of the first transistor 666 arranged on the primary circuit side 601 of the circuit 600 in FIG. 6. Hence the y-axis 704 in FIG. 7C denotes the amplitude of the driver signal 746 which may assume a low value or a high value, depending on whether the first transistor 666 is to be switched on (rendered into a conducting state) or switched off (rendered into a non-conducting state). In diagram 760 in FIG. 7D a synchronous rectification driver signal 760 corresponding to or derived from the signal provided by the controller 650 at its fifth terminal SRGD is shown. The synchronous rectification driver signal 760 may be applied to the control terminal of the second switch 678, for example the gate of the second transistor 678, arranged on the secondary circuit side 603 of the circuit 600 according to various embodiments shown in FIG. 6. Hence the y-axis 704 in FIG. 7D denotes the amplitude of the driver signal for the second switch 678 which may, in analogy to the driver signal 746 shown in diagram 740 of FIG. 7C assume a low value or a high value, depending on whether the second switch 678 is to be closed (activated) or opened (deactivated).

At a first time $t_1$ the driver signal 746 applied to the control terminal of the first switch 666 is switched to a high value, activating the first switch 666 such that an electrical path from the first input 602 of the converter circuit 600 to the to the reference potential via the third inductor 630 is provided. A steadily rising primary side transformer current 724 begins to flow at a first time $t_1$ through the third inductor 630 which is included in the first transformer 631. It is to be noted that the effect of the driver signal 746 on the first switch 666 depends on the choice of the switch. In this exemplary scenario, where the first switch 666 may be configured as an enrichment MOSFET transistor, a high potential applied to its gate renders the first transistor 666 into a conducting state. However, the first switch 666 may be just as well configured as a depletion MOSFET transistor such that the kind of potential necessary to switch on and switch off the first transistor 666 may be adapted correspondingly. The first switch 666 may remain in the conducting-state until a second time $t_2$. As shown in diagram 740 of FIG. 7C, a high potential pulse 742 having a width of $T_{OnFB}$ corresponding to the on-time of the first switch 666 is applied to the gate of the first switch 666 from the first time $t_1$ until the second time $t_2$. As the auxiliary detection inductor, i.e. the fourth inductor 634 in FIG. 6, is magnetically coupled to the third inductor 630, a voltage is induced in the auxiliary detection inductor 634 and sensed at the second terminal ZCD of the controller 650 during the time the first switch 666 remains switched on. The sense of winding of the third inductor 630 is opposite to the sense of winding of the auxiliary detection inductor 634, so a positive input voltage applied to the third inductor 630 induces a negative voltage across the auxiliary detection inductor 634, its value corresponding to the input voltage multiplied with the number of windings $N_{AUX}$ of the auxiliary detection inductor 634 divided by the number of windings $N_{Sek}$ of the fifth inductor 632. For the time $t_{OnFB}$ during which the first switch 666 remains switched on, the detection voltage 706 across the auxiliary detection inductor 634 remains at a constant negative value and the primary side transformer current 724 through the third inductor 630 continues to grow linearly. During the on-time 744 of the first transistor 666, the input voltage may be sampled by the zero crossing detection and voltage measurement circuit 6122 at a first sample time $t_{S1}$. During the on-time 744 of the first transistor 666, the switch 678 on the secondary circuit side of the circuit 600, for example the second transistor 678, may remain switched off and the corresponding synchronous rectification driver signal 768 may remain at its low value, for example at zero. The same as said above with respect to the effect of the driver signal 742 on the first switch 666 also applies to the second switch 678. At the second time $t_2$, the PWM pulse 742 driving the first transistor 666 may be terminated and the driver signal 742 may return to its low value, for example to zero. The time span between the time t1 and the time t2, i.e. the on-time 744 ($T_{onFB}$) of the first transistor 666, may be detected by the time measurement circuit 6126 and provided to the synchronous rectification predictive calculation circuit 6130. Upon deactivation of the first transistor 666, the current flow through the third inductor 630 is interrupted. The second transistor 678 may be then activated by a corresponding value of the synchronous rectification driver signal 768, for example a high signal level thereof, and a demagnetization current may flow through the fifth inductor 632 and may for example charge the tenth capacitor 670. The second switch 678 may remain switched on until a third time $t_3$, such that the time span $T_{OnSR}$ between the second time $t_2$ and the third time $t_3$ corresponds to the on-time 764 of the second transistor 678 or, in other words, the synchronous rectification time during which the second switch 678 on the secondary circuit side 603 is in conducting state. During that time, the demagnetization current in the form of the secondary side transformer current 722 induced in the fifth inductor 632 steadily declines as can be seen in diagram 720 of FIG. 7B. The secondary side transformer current 722 induces a voltage across the auxiliary detection inductor 634, the value of which corresponds to the output voltage provided between the first output 672 and the second output 674 of the circuit 600, multiplied with the ratio between the number of windings $N_{AUX}$ of the auxiliary detection inductor 634 and the number of windings $N_{Sek}$ of the fifth inductor 632. As can be seen in diagram 700 of FIG. 7A, the detection voltage 706 sampled at the auxiliary detection inductor 634 remains at its positive value for the time span between the second time $t_2$ and the third time $t_3$. The synchronous rectification predictive calculation circuit 6130 may calculate or predict the on-time 764 of the second transistor 678 from the voltage second balance theorem which was already described above. The calculated or estimated on-time 764 of the second switch 678 providing synchronous rectification is transmitted to the synchronous rectification driver circuit 6128 which may provide a PWM signal to the control terminal of the second switch 678, thereby controlling its state. Therefore, the time span between the second time $t_2$ and the time $t_3$ may correspond to the calculated or predicted on-time 764 of the synchronous rectification switch 678 as determined by the rectification predictive calculation circuit 6130.

In an ideal case, the second switch 678, for example the second transistor 678, would be switched off at the time when the demagnetization current on the secondary circuit side 603 falls to zero, i.e. at the third time $t_3$ which corresponds to the demagnetization zero current time. However, due to tolerances of the used components and possible error margins, the second switch 678 may be deactivated before the first transformer 631 is completely demagnetized and the demagnetization current 722 reaches its zero value. Such an early deactivation of the second switch 678 may prevent situations in which the tenth capacitor 670 which serves as an energy storage providing the output voltage $V_{out}$ to an output load which may be connected to the first output 672 and the second output 674 of the circuit 600 is discharged via the fifth inductor 632 and the second transistor 678 to ground. Such a discharge current directly translates into a power loss as the capacitor 670 is unnecessarily discharged. A discharge of the capacitor 670 will take place whenever the second transistor 678 remains switched on after the fifth inductor 632 is fully demagnetized which is the case at the third time $t_3$. However, to remain on the safe side, the second transistor 678 may be switched off prior to the third time $t_3$.

During a normal operation of SMPS circuit 600, the first transistor 666 may be switched on after the second transistor 678 has been switched off, such that a new cycle may begin of storing energy in the magnetic field of the third inductor 630 and then transferring that energy to the fifth inductor 632. Different operation modes of the SMPS may be realized, depending on when the second transistor 678 is switched on.

If the second transistor 678 is switched back on at the third time $t_3$, the secondary side transformer current 722 will practically never be zero (or technically be zero for a negligible amount of time). In this case, the SMPS circuit 600 would operate in the continuous current mode.

If, on the other hand, the second transistor 678 is switched on at any time later than the third time $t_3$, the secondary side transformer current 722 will drop below zero and hence the SMPS circuit 600 will operate in the discontinuous current mode.

In diagram 700 in FIG. 7A it can be seen that the detection voltage 706 starts oscillating at the third time t3, i.e. after the second transistor 678 has been switched off at the third time t3. That behaviour is observable only when an ideal second switch 678 is assumed which is perfectly non-conducting in off-state, for example a transistor without a body diode which would allow a current flow despite the second switch 678 being in non-conducting state. The oscillation period will be given by the system parameters and will also encompass parasitic capacitances and parasitic inductances inherent in the system, for example the source-drain capacitance of the first transistor 666 and/or the source-drain capacitance of the second transistor 678 and/or parasitic capacitances of the transformer 632. In order to minimize switching losses, the first transistor 666 may be switched on at zero crossings of the detection voltage 706, which may be easily detected by the zero crossing detection and voltage measurement circuit 6122. Switching the first transistor 666 back on at the first zero crossing 708, the second zero crossing 710 or the third zero crossing 712 (or any further zero crossing in the oscillating part of the detection voltage 706) will result in the so-called quasi-resonant operation of the SMPS circuit 600 according to various embodiments. The quasi-resonant operation mode may be seen as a special case of the discontinuous current mode.

Triggering the switching on of the first switch 666 on the primary side of the SMPS circuit 600 by zero crossings may be for example used in low load conditions. With low loads connected to the SMPS circuit 600, the on-time 744 ($T_{OnFB}$) of the first transistor 666 will become shorter as only little energy is required consequently leading to shorter $T_{OnSR}$ time required for the secondary side transformer current to reach zero. Speaking figuratively, the triangle in diagram 720 in FIG. 7A would become smaller, having a shorter base. This would lead to a faster frequency of the PWM signal provided to the switches in the SMPS circuit 600 according to various embodiments. By triggering the switching on of the first transistor 666 on the first zero crossing point 708, the second zero crossing point 710, the third zero crossing point 712 or any further zero crossing point, an increase of the frequency of the PWM signal may be effectively prevented, while the first transistor 666 is being selectively switched on at times when the voltage applied to it is zero, hence minimizing switching losses.

In FIG. 8, the method which may be implemented in the controller 650 of the switched mode power supply circuit 600 is explained.

In a first step 802, a first voltage which may be applied to the first side of the transformer 631 may be determined. The first voltage may, for example, correspond to the input voltage $V_{in}$ applied to the first input 602 and/or second input 604 of the circuit 600. The first side of the transformer 631 may correspond to the third inductor 630 or the primary circuit side 601 including the third inductor 630 which is connected to the input of the circuit 600. The first voltage may be determined by sensing or detecting the voltage induced on the windings of the auxiliary detection inductor 634. The detection of the first input voltage $V_{in}$ may be performed by the zero crossing detection and voltage measurement circuit 6122 which is included in the controller 650 by sampling the voltage of the auxiliary winding of the transformer 631 at predefined time intervals as already explained with regard to FIGS. 7A to 7D.

In a second step 804, a second voltage being applied to the second side of the transformer 631 may be determined. The second voltage may, for example, correspond to the voltage induced across the second side of the transformer 631 which may correspond to the fifth inductor 632. The second voltage may be determined by sensing or detecting the voltage induced on the windings the auxiliary inductor 634 during the time the second switch 678 is activated. The measuring or monitoring of the second voltage may be performed by the zero crossing detection and voltage measurement circuit 6122 which is included in the controller 650 by sampling the voltage of the auxiliary detection inductor 634 of the transformer 631. In other words, information about the output voltage provided at the output of the circuit 600 may be obtained by detecting the voltage induced in the auxiliary detection inductor 634 due to the flow of a demagnetization current through the fifth inductor 632, corresponding to the second side of the transformer 631, and the secondary side circuit 603.

In a third step 806, a time the first voltage is provided to a winding of the transformer may be determined. The time may correspond to the time during which the first voltage is applied to the third inductor 630. That time may be determined by sensing or detecting the voltage across the auxiliary detection inductor 634 induced by a flow of a current through the third inductor 630 when the first switch, for example the first transistor 666, is in its conducting or activated state. Alternatively, that time may be determined by detecting the time during which the first switch 666 is in its conducting or activated state, for example by monitoring the potential applied to its control terminal as may be performed by the time measurement circuit 6126 provided in the controller 650.

In a fourth step 808, the demagnetization zero current time may be determined. In accordance with various embodiments, the demagnetization zero current time may correspond to the point in time at which the demagnetization current flowing through the second side of the transformer, for example the fifth inductor 632, drops to zero due to the transformer 631 being completely demagnetized. This event may be determined by the zero crossing detection and voltage measurement circuit 6122 provided in the controller 650 and indicated to the synchronous rectification predictive calculation circuit 6130 provided in the controller 650. The demagnetization zero current time may correspond to the time during which the second switch 678 provided in the secondary side circuit 603 of the circuit 600 is to be activated thereby providing the functionality of synchronous rectification. The demagnetization zero current time may be determined from a steady state of the first transformer 631 using the voltage second balance theorem. From the input voltage $V_{in}$ applied to the circuit 600 determined in the first step 802, the output voltage $V_{out}$ of the circuit 600 determined in the second step 804 and from the first time $t_{onFB}$ determined in the third step, the demagnetization zero current time $t_{onSR}$ may be determined according to the following formula:

$$t_{onSR} = \frac{t_{onFB}}{n} \cdot \frac{V_{in}}{V_{out}},$$

wherein n denotes the ratio of the number of windings $N_P$ on the coil of first side of the transformer, i.e. the third inductor 630, to the number of windings $N_{Sek}$ of the second side of the transformer, i.e. the fifth inductor 632.

In accordance with various embodiments, a method for determining a demagnetization zero current time for a switched mode power supply comprising a transformer and a first portion and a second portion being galvanically separated from each other by the transformer, and a switched mode power supply controller is provided, wherein the method may include: determining a first voltage being applied to one side of the transformer; determining a second voltage provided at the other side of the transformer; determining a time the first voltage is provided to a winding of the transformer; and determining, by a circuit located on the same side of the transformer as the switched mode power supply controller, the demagnetization zero current time using the determined first voltage, the determined second voltage and the determined time.

According to various further embodiments of the method, the switched mode power supply may further include a galvanically isolated transmitter, wherein the galvanically isolated transmitter transmits a switching signal from the circuit to the other side of the galvanically isolated transmitter.

According to various further embodiments of the method, the determining of the first voltage may include determining the first voltage using an auxiliary winding of the transformer on the one side of the transformer.

According to various further embodiments of the method, the determining of the first voltage may include measuring the first voltage in the one portion.

According to various further embodiments of the method, the determining of the second voltage may include determining the second voltage using an auxiliary winding of the transformer on the one side of the transformer.

According to various further embodiments of the method, the determining the time the first voltage is provided to a primary winding of the transformer may include measuring the time the first voltage is provided to the winding of the transformer.

According to various further embodiments of the method, the measuring the time the first voltage is provided to the winding of the transformer may include measuring the time the first voltage is provided to the winding at the output of a driver switch on one portion of the switched mode power supply.

According to various further embodiments of the method, the measuring the time the first voltage is provided to the winding of the transformer may be carried out in current mode.

According to various further embodiments of the method, the measuring the time the first voltage is provided to the winding of the transformer may be carried out in voltage mode.

According to various further embodiments of the method, the measuring the time the first voltage may be provided to the winding of the transformer may include measuring a signal representing a current through or a voltage at the winding of the transformer and determining the time using the signal.

According to various further embodiments of the method, the circuit may include an analog circuit and the analog circuit may determine the demagnetization zero current time in an analog manner.

According to various further embodiments of the method, the circuit may comprise a digital circuit and the digital circuit may determine the demagnetization zero current time in a digital manner.

According to various further embodiments of the method, the circuit may be configured as a finite state machine.

According to various further embodiments of the method, the circuit may be configured as a field programmable gate array or as an application specific integrated circuit.

According to various further embodiments of the method, the circuit may include a processor.

According to various further embodiments of the method, the circuit may comprise firmware or a microprocessor.

According to various further embodiments of the method, the one side may be the primary side of the transformer and the other side may be the secondary side of the transformer.

According to various further embodiments of the method, the one side may be the secondary side of the transformer and the other side may be the primary side of the transformer.

In accordance with various further embodiments a method for controlling a switched mode power supply including a transformer and a first side and a second side being galvanically separated from each other, and a switched mode power supply controller is provided, the method including: determining a demagnetization zero current time for the switched mode power supply, the determining including: determining a first voltage being applied to one side of the transformer; determining a second voltage provided at the other side of the transformer; determining a time the first voltage is provided to a winding of the transformer; and determining, by a circuit located on the same side of the transformer as the switched mode power supply controller, the demagnetization zero current time using the determined first voltage, the determined second voltage and the determined time.

According to various further embodiments of the method, the controlling the switch on the second side includes a switching off the switch in accordance with the determined demagnetization zero current time.

According to various further embodiments of the method, the switch on the second side may be controlled such that it is switched off a predefined time before the determined demagnetization zero current time.

In accordance with various embodiments a circuit arrangement for determining a demagnetization zero current time for a switched mode power supply comprising a transformer and a first portion and a second portion being galvanically separated from each other, and a switched mode power supply controller is provided, the circuit arrangement including: the switched mode power supply controller located on one side of the transformer; a first determiner configured to determine a first voltage being applied to one side of the transformer; a second determiner configured to determine a second voltage provided at the other side of the transformer; a third determiner configured to determine a time the first voltage is provided to a winding of the transformer; and a circuit located on the same side of the transformer as the switched mode power supply controller, wherein the circuit is configured to determine the demagnetization zero current time using the determined first voltage, the determined second voltage and the determined time.

According to various further embodiments of the circuit arrangement, the first determiner may be further configured to determine the first voltage using an auxiliary winding of the transformer on the one side of the transformer.

According to various further embodiments of the circuit arrangement, the first determiner may be further configured to measure the first voltage on the one side.

According to various further embodiments of the circuit arrangement, the second determiner may be further configured to determine the second voltage using an auxiliary winding of the transformer on the one side of the transformer.

According to various further embodiments of the circuit arrangement, the third determiner may be configured to measure the time the first voltage is provided to the winding of the transformer.

According to various further embodiments of the circuit arrangement the third determiner may be configured to measure the time the first voltage is provided to the winding at the output of a driver switch on one side of the switched mode power supply.

According to various further embodiments of the circuit arrangement the third determiner may be configured to measure the time the first voltage is provided to the winding of the transformer in current mode.

According to various further embodiments of the circuit arrangement, the third determiner may be configured to measure the time the first voltage is provided to the winding of the transformer in voltage mode.

According to various further embodiments of the circuit arrangement, the third determiner may be configured to measure a signal representing a current through or a voltage at the winding of the transformer; and to determine the time using the signal.

According to various further embodiments of the circuit arrangement, the circuit may include an analog circuit configured to determine the demagnetization zero current time in an analog manner.

According to various further embodiments of the circuit arrangement, the circuit may include a digital circuit configured to determine the demagnetization zero current time in a digital manner.

According to various further embodiments of the circuit arrangement,
the circuit may be configured as a finite state machine.

According to various further embodiments of the circuit arrangement, the circuit may be configured as a field programmable gate array (FPGA) or as an application specific integrated Circuit (ASIC).

According to various further embodiments of the circuit arrangement, the circuit may include a processor.

According to various further embodiments of the circuit arrangement, the circuit may include firmware or a microprocessor.

In accordance with various further embodiments a switched mode power supply is provided, including a transformer and a first side and a second side being galvanically separated from each other; a switched mode power supply controller located on one side of the transformer; a first determiner configured to determine a first voltage being applied to one side of the transformer; a second determiner configured to determine a second voltage provided at the other side of the transformer; a third determiner configured to determining a time the first voltage is provided to a winding of the transformer; and a circuit located on the same side of the transformer as the switched mode power supply controller, wherein the circuit is configured to determine the demagnetization zero current time using the determined first voltage, the determined second voltage and the determined time.

According to various further embodiments of the switched mode power supply, the switched mode power supply may further include a galvanically isolated transmitter, wherein the galvanically isolated transmitter is configured to transmit a switching signal from the circuit to the other side of the galvanically isolated transmitter.

According to various further embodiments of the switched mode power supply, the first side may be the primary side of the transformer, and the second side may be the secondary side of the transformer.

According to various further embodiments of the switched mode power supply, the first side may be the secondary side of the transformer; and the second side may be the primary side of the transformer.

In accordance with various further embodiments a method for determining a demagnetization zero current time for a switched mode power supply including a transformer and a first side and a second side being galvanically separated from each other is provided, the method including: determining an input voltage of the first side; determining an output voltage of the second side; determining a time the input voltage is provided to a winding of the transformer, and determining, by a circuit located on the first side of the switched mode power supply, the demagnetization zero current time using the determined input voltage, the determined output voltage and the determined time.

According to various further embodiments, the method may further include a galvanically isolated transmitter arranged to isolate the first side and the second side, wherein the galvanically isolated transmitter transmits a switching signal from the circuit to the second side.

According to various further embodiments of the method, the determining the input voltage may include determining the input voltage using an auxiliary winding of the transformer on the first side of the transformer.

According to various further embodiments of the method the determining the input voltage may include measuring the input voltage on the first side.

According to various further embodiments of the method the determining the output voltage may include determining the output voltage using an auxiliary winding of the transformer on the second side of the transformer.

According to various further embodiments of the method, the determining the time the input voltage is provided to a primary winding of the transformer may include measuring the time the input voltage is provided to the winding of the transformer.

According to various further embodiments of the method the measuring the time the input voltage is provided to the winding of the transformer may include measuring the time the input voltage is provided to the winding at the output of a driver switch on one side of the switched mode power supply.

According to various further embodiments of the method the measuring the time the input voltage is provided to the winding of the transformer may be carried out in current mode.

According to various further embodiments of the method the measuring the time the input voltage is provided to the winding of the transformer may be carried out in voltage mode.

According to various further embodiments of the method the measuring the time the input voltage is provided to the winding of the transformer may include: measuring a signal representing a current through or a voltage at the winding of the transformer, and determining the time using the signal.

According to various further embodiments of the method the circuit may include an analog circuit and the analog circuit may determine the demagnetization zero current time in an analog manner.

According to various further embodiments of the method the circuit may include a digital circuit, and the digital circuit may determine the demagnetization zero current time in a digital manner.

According to various further embodiments of the method the circuit may be configured as a finite state machine.

According to various further embodiments of the method the circuit may be configured as a field programmable gate array (FPGA) or as an application specific integrated circuit (ASIC).

According to various further embodiments of the method the circuit may include a processor.

According to various further embodiments of the method the circuit may include firmware or a microprocessor.

According to various further embodiments of the method the first side may be the primary side of the transformer; and wherein the second side may be the secondary side of the transformer.

According to various further embodiments of the method the first side may be the secondary side of the transformer, and the second side may be the primary side of the transformer.

In various further embodiments a method for controlling a switched mode power supply including a transformer and a first side and a second side being galvanically separated from each other is provided, the method including: determining a demagnetization zero current time for the switched mode power supply, the determining including: determining an input voltage of the first side; determining an output voltage of the second side; determining a time the input voltage is provided to a winding of the transformer; and determining, by a circuit located on the first side of the switched mode power supply, the demagnetization zero current time using the determined input voltage, the determined output voltage and the determined time.

According to various further embodiments of the method the controlling the switch on the second side may include a switching off of the switch in accordance with the determined demagnetization zero current time.

According to various further embodiments of the method the switch on the second side may be controlled such that it is switched off a predefined time before the determined demagnetization zero current time.

In various further embodiments a circuit arrangement for determining a demagnetization zero current time for a switched mode power supply including a transformer and a first side and a second side being galvanically separated from each other is provided, the circuit arrangement including: the switched mode power supply controller located on the first side of the transformer; a first determiner configured to determine an input voltage being applied to first side of the transformer; a second determiner configured to determine an output voltage provided at the second side of the transformer; a third determiner configured to determining a time the input voltage is provided to a winding of the transformer; and a circuit located on the first side of the transformer, wherein the circuit is configured to determine the demagnetization zero current time using the determined input voltage, the determined output voltage and the determined time.

According to various further embodiments of the circuit arrangement the first determiner may be further configured to determine the input voltage using an auxiliary winding of the transformer on the first side of the transformer.

According to various further embodiments of the circuit arrangement the first determiner may be further configured to measure the input voltage on the first side.

According to various further embodiments of the circuit arrangement the second determiner may be further configured to determine the output voltage using an auxiliary winding of the transformer on the second side of the transformer.

According to various further embodiments of the circuit arrangement the third determiner may be configured to measure the time the input voltage is provided to the winding of the transformer.

According to various further embodiments of the circuit arrangement the third determiner may be configured to measure the time the input voltage is provided to the winding at the output of a driver switch on one side of the switched mode power supply.

According to various further embodiments of the circuit arrangement the third determiner may be configured to measure the time the input voltage is provided to the winding of the transformer in current mode.

According to various further embodiments of the circuit arrangement the third determiner may be configured to measure the time the input voltage is provided to the winding of the transformer in voltage mode.

According to various further embodiments of the circuit arrangement the third determiner may be configured to measure a signal representing a current through or a voltage at the winding of the transformer; and to determine the time using the signal. According to various further embodiments of the circuit arrangement the circuit may include an analog circuit configured to determine the demagnetization zero current time in an analog manner.

According to various further embodiments of the circuit arrangement the circuit may include a digital circuit configured to determine the demagnetization zero current time in a digital manner.

According to various further embodiments of the circuit arrangement the circuit may be configured as a finite state machine.

According to various further embodiments of the circuit arrangement the circuit may be configured as a field programmable gate array (FPGA) or as an application specific integrated circuit (ASIC).

According to various further embodiments of the circuit arrangement the circuit may include a processor.

According to various further embodiments of the circuit arrangement the circuit may include firmware or a microprocessor.

In various further embodiments a switched mode power supply is provided which may include a transformer and a first side and a second side being galvanically separated from each other; a first determiner configured to determine an input voltage being applied to the first side of the transformer; a second determiner configured to determine an output voltage provided at the second side of the transformer; a third determiner configured to determining a time the input voltage is provided to a winding of the transformer; and a circuit located on the first side of the transformer, wherein the circuit is configured to determine the demagnetization zero current time using the determined input voltage, the determined output voltage and the determined time.

According to various further embodiments, the switched mode power supply may further include a galvanically isolated transmitter, wherein the galvanically isolated transmitter is configured to transmit a switching signal from the circuit to the second side of the galvanically isolated transmitter.

According to various further embodiments of the switched mode power supply the first side may be the primary side of the transformer; and wherein the second side is the secondary side of the transformer.

According to various further embodiments of the switched mode power supply the first side may be the secondary side of the transformer; and the second side may be the primary side of the transformer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for determining a demagnetization zero current time for a switched mode power supply comprising a transformer having a first side and a second side galvanically separated from each other, and a switched mode power supply controller coupled to the first side of the transformer, the method comprising:
    obtaining a first voltage being applied to the first side of the transformer;
    obtaining a second voltage provided to the second side of the transformer;
    ascertaining a time the first voltage is provided to a winding of the first side of the transformer; and
    estimating, by a circuit located on the first side of the transformer, the demagnetization zero current time using the obtained first voltage, the obtained second voltage and the ascertained time.

2. The method of claim 1,
    wherein the switched mode power supply further comprises a galvanically isolated transmitter;
    wherein the galvanically isolated transmitter transmits a switching signal from the circuit to the second side of the galvanically isolated transmitter.

3. The method of claim 1,
    wherein the obtaining the first voltage comprises obtaining the first voltage using an auxiliary winding of the transformer on the first side of the transformer.

4. The method of claim 1,
    wherein the obtaining the second voltage comprises obtaining the second voltage using an auxiliary winding of the transformer on the first side of the transformer.

5. The method of claim 1,
    wherein the ascertaining the time the first voltage is provided to the winding of the transformer comprises measuring the time the first voltage is provided to the winding at the output of a driver switch of the switched mode power supply.

6. The method of claim 1,
wherein the ascertaining the time the first voltage is provided to the winding of the transformer is carried out in current mode.

7. The method of claim 1,
wherein the ascertaining the time the first voltage is provided to the winding of the transformer is carried out in voltage mode.

8. The method of claim 1, further comprising:
controlling a second side switch by the circuit located on the first side of the transformer based on the estimated demagnetization zero current time.

9. A method for controlling a switched mode power supply comprising a transformer having a first side and a second side galvanically separated from each other, and a switched mode power supply controller coupled to the first side, the method comprising:
estimating a demagnetization zero current time for the switched mode power supply, the determining comprising:
obtaining a first voltage being applied to one side of the transformer;
obtaining a second voltage provided at the other side of the transformer;
ascertaining a time the first voltage is provided to a winding of the transformer; and
estimating, by a circuit located on the first side of the transformer, the demagnetization zero current time using the obtained first voltage, the obtained second voltage and the ascertained time.

10. The method of claim 9, further comprising:
switching off a switch on the second side in accordance with the estimated demagnetization zero current time.

11. The method of claim 9,
wherein a switch on the second side is controlled such that it is switched off a predefined time before the estimated demagnetization zero current time.

12. The method of claim 11,
wherein the switch on the second side is controlled by the circuit located on the first side of the transformer.

13. A circuit arrangement for determining a demagnetization zero current time for a switched mode power supply comprising a transformer having a first side and a second side galvanically separated from each other, the circuit arrangement comprising:
a switched mode power supply controller coupled to the first side of the transformer;
a voltage measurement circuit configured to measure a first voltage being applied to the first side of the transformer and a second voltage provided at the second side of the transformer;
a time measurement circuit configured to measure a time the first voltage is provided to a winding of the transformer; and
a circuit located on the first side of the transformer, wherein the circuit is configured to estimate the demagnetization zero current time using the measured first voltage, the measured second voltage and the measured time.

14. The circuit arrangement of claim 13,
wherein the voltage measurement circuit is further configured to measure the first voltage using an auxiliary winding of the transformer on the first side of the transformer.

15. The circuit arrangement of claim 13,
wherein the voltage measurement circuit is further configured to measure the first voltage on the first side.

16. The circuit arrangement of claim 13,
wherein the time measurement circuit is configured to measure a signal representing a current through or a voltage at the winding of the transformer; and to measure the time using the signal.

17. The circuit arrangement of claim 13,
wherein the circuit located on the first side of the transformer is further configured to control a switch located on the second side of the transformer based on the estimated demagnetization zero current time.

18. A switched mode power supply, comprising:
a transformer having a first side and a second side galvanically separated from each other;
a switched mode power supply controller located on the first side of the transformer;
a voltage measurement circuit configured to measure a first voltage being applied to the first side of the transformer and a second voltage provided at the second side of the transformer;
a time measurement circuit configured to measure a time the first voltage is provided to a winding of the transformer; and
a circuit located on the first side of the transformer, wherein the circuit is configured to estimate the demagnetization zero current time using the measured first voltage, the measured second voltage and the measured time.

19. The switched mode power supply of claim 18,
wherein the switched mode power supply further comprises a galvanically isolated transmitter;
wherein the galvanically isolated transmitter is configured to transmit a switching signal from the circuit located on the first side of the transformer to the second side of the galvanically isolated transmitter.

20. The switched mode power supply of claim 18,
wherein the first side is the primary side of the transformer; and
wherein the second side is the secondary side of the transformer.

21. The switched mode power supply of claim 18,
wherein the first side is the secondary side of the transformer; and
wherein the second side is the primary side of the transformer.

22. The switched mode power supply of claim 19, further comprising:
a switch located on the second side of the transformer, wherein the switch is controlled by the switching signal from the circuit located on the first side of the transformer based on the estimated demagnetization zero current time.

23. A method for determining a demagnetization zero current time for a switched mode power supply comprising a transformer having a first side and a second side galvanically separated from each other, the method comprising:
obtaining an input voltage of the first side;
obtaining an output voltage of the second side;
ascertaining a time the input voltage is provided to a winding of the transformer; and
estimating, by a circuit located on the first side of the switched mode power supply, the demagnetization zero current time using the obtained input voltage, the obtained output voltage and the ascertained time.

24. The method of claim 23,
wherein the switched mode power supply further comprises a galvanically isolated transmitter arranged to isolate the first side and the second side;

wherein the galvanically isolated transmitter transmits a switching signal from the circuit located on the first side of the switched mode power supply to the second side.

25. The method of claim 24, further comprising:
controlling a switch located on the second side of the transformer by the transmitted switching signal from the circuit located on the first side of the switched mode power supply based on the estimated demagnetization zero current time.

26. A method for controlling a switched mode power supply comprising a transformer having a first side and a second side galvanically separated from each other, the method comprising:
estimating a demagnetization zero current time for the switched mode power supply, the estimating comprising:
obtaining an input voltage of the first side;
obtaining an output voltage of the second side;
ascertaining a time the input voltage is provided to a winding of the transformer; and
estimating, by a circuit located on the first side of the switched mode power supply, the demagnetization zero current time using the obtained input voltage, the obtained output voltage and the ascertained time.

27. The method of claim 26, further comprising:
switching off a switch on the second side in accordance with the estimated demagnetization zero current time.

28. The method of claim 26,
wherein a switch on the second side is controlled such that it is switched off a predefined time before the estimated demagnetization zero current time.

29. The method of claim 28,
wherein the switch on the second side is controlled by the circuit located on the first side of the transformer.

30. A circuit arrangement for determining a demagnetization zero current time for a switched mode power supply comprising a transformer having a first side and a second side galvanically separated from each other, the circuit arrangement comprising:
the switched mode power supply controller located on the first side of the transformer;
a voltage measurement circuit configured to measure an input voltage being applied to first side of the transformer and an output voltage provided at the second side of the transformer;
a time measurement circuit configured to measure a time the input voltage is provided to a winding of the transformer; and
a circuit located on the first side of the transformer, wherein the circuit is configured to estimate the demagnetization zero current time using the measured input voltage, the measured output voltage and the measured time.

31. The circuit arrangement of claim 30,
wherein the circuit located on the first side of the transformer is further configured to control a switch located on the second side of the transformer based on the estimated demagnetization zero current time.

32. A switched mode power supply, comprising:
a transformer having a first side and a second side galvanically separated from each other;
a voltage measurement circuit configured to measure an input voltage being applied to the first side of the transformer and an output voltage provided at the second side of the transformer;
a time measurement circuit configured to measure a time the input voltage is provided to a winding of the transformer; and
a circuit located on the first side of the transformer, wherein the circuit is configured to estimate the demagnetization zero current time using the measured input voltage, the measured output voltage and the measured time.

33. The switched mode power supply of claim 32,
wherein the circuit located on the first side of the transformer is further configured to control a switch located on the second side of the transformer based on the estimated demagnetization zero current time.

* * * * *